US009800972B2

(12) United States Patent
Bauer

(10) Patent No.: US 9,800,972 B2
(45) Date of Patent: Oct. 24, 2017

(54) DISTRIBUTED AUDIO SYSTEM

(71) Applicant: Nicholaus J. Bauer, Joliet, IL (US)

(72) Inventor: Nicholaus J. Bauer, Joliet, IL (US)

( * ) Notice: Subject to any disclaimer, the term of this patent is extended or adjusted under 35 U.S.C. 154(b) by 0 days.

(21) Appl. No.: 15/090,983

(22) Filed: Apr. 5, 2016

(65) Prior Publication Data

US 2016/0295321 A1 Oct. 6, 2016

Related U.S. Application Data

(60) Provisional application No. 62/143,137, filed on Apr. 5, 2015.

(51) Int. Cl.

*H04B 3/00* (2006.01)
*H04R 5/02* (2006.01)
*H04R 3/00* (2006.01)
*H04S 5/00* (2006.01)

(52) U.S. Cl.

CPC .......... *H04R 3/00* (2013.01); *H04R 2420/07* (2013.01); *H04S 5/005* (2013.01)

(58) Field of Classification Search

CPC .............................. H04R 2420/07; H04R 3/00
USPC ........................................................... 381/77
See application file for complete search history.

(56) References Cited

U.S. PATENT DOCUMENTS 7,076,204 B2 * 7/2006 Richenstein ........... H04H 20/62 381/14
8,059,941 B2 * 11/2011 Chen ...................... G11B 27/10 380/201
9,501,259 B2 * 11/2016 Malsbary ................ G06F 3/165
2002/0068610 A1 * 6/2002 Anvekar ............. H04M 1/6066 455/560
2005/0259977 A1 * 11/2005 Chen ...................... G11B 27/10 386/246
2006/0249010 A1 * 11/2006 John ....................... F41A 19/68 89/1.11
2007/0087686 A1 * 4/2007 Holm ........................ H04S 7/30 455/3.06
2007/0174287 A1 * 7/2007 McEnroe ............... H04N 7/163
2008/0267282 A1 * 10/2008 Kalipatnapu ....... H04L 12/1822 375/240.01
2009/0147004 A1 * 6/2009 Ramon ..................... G06T 3/40 345/428
2010/0100798 A1 * 4/2010 Visan .................... H04L 1/0046 714/799
2010/0118114 A1 * 5/2010 Hosseini ................ H04N 7/148 348/14.09
2011/0221960 A1 * 9/2011 Glaznev ............. H04N 21/2368 348/515
2011/0261899 A1 * 10/2011 Walton ................. H04B 7/0452 375/295
2011/0274156 A1 * 11/2011 Mighani ............ H04N 21/2381 375/240.02

(Continued)

*Primary Examiner* — Khai N Nguyen
(74) *Attorney, Agent, or Firm* — Fleit Gibbons Gutman Bongini Bianco PL; Thomas S. Grzesik

(57) ABSTRACT

Various embodiments manage a distributed audio system is disclosed. In one embodiment, an audio stream is received from each electronic device in a plurality of electronic devices. The audio stream is captured by at least one audio input module of the electronic device. Two or more of the audio streams are aggregated into a single audio stream. The single audio stream is outputted via at least one audio output module.

19 Claims, 7 Drawing Sheets

(56) References Cited

U.S. PATENT DOCUMENTS

| | | | | |
|---|---|---|---|---|
| 2012/0069134 | A1* | 3/2012 | Garcia, Jr. | H04M 3/568 348/14.08 |
| 2012/0311090 | A1* | 12/2012 | Locker | H04L 12/1822 709/218 |
| 2013/0021432 | A1* | 1/2013 | Kalipatnapu | H04L 12/1822 348/14.09 |
| 2013/0039496 | A1* | 2/2013 | Grandinetti | G10H 1/0083 381/17 |
| 2013/0290418 | A1* | 10/2013 | Liu | H04L 12/1854 709/204 |
| 2014/0233716 | A1* | 8/2014 | Villette | H04M 3/568 379/202.01 |
| 2015/0089046 | A1* | 3/2015 | Waxman | H04L 49/206 709/224 |
| 2015/0094834 | A1* | 4/2015 | Vega | G06F 3/165 700/94 |
| 2015/0117674 | A1* | 4/2015 | Meachum | H04L 65/4038 381/94.1 |
| 2015/0146881 | A1* | 5/2015 | Malsbary | G06F 3/165 381/80 |
| 2015/0148928 | A1* | 5/2015 | Malsbary | G06F 3/165 700/94 |
| 2015/0350803 | A1* | 12/2015 | Wyatt | H04R 3/12 381/17 |
| 2016/0019903 | A1* | 1/2016 | Nagle | H04M 3/568 704/500 |

* cited by examiner

DISTRIBUTED AUDIO SYSTEM

BACKGROUND

The present disclosure generally relates to a network of electronic devices, and more particularly relates to a distributed audio system utilizing comprising a multi-node microphone and/or a multi-node speaker system.

Currently there are multi-speaker systems which connect via short-range communication to enable mono or stereo sound. This enables a mobile device with a low power low fidelity speaker to connect to one or two higher quality speakers for the purpose of increased decibel and higher quality playback. Bluetooth headsets offer a single-location remote microphone/microphone array.

BRIEF SUMMARY

In one embodiment, a system for enabling a plurality of devices to aggregate remote microphones is disclosed. The system comprises a plurality of devices that communicate wirelessly. These devices may have a fixed or dynamic position. The devices are able to record time offsets relative to one another and filter late-arriving data streams. A configuration unit allows specific parameters related to the number of clients, timing thresholds, and audio encoding/decoding. A plurality of electronic devices is used as discrete component speakers, enabling separated playback of audio streams and sub-streams.

In another embodiment, a method for managing a distributed audio system is disclosed. The method comprises receiving an audio stream from each electronic device in a plurality of electronic devices. The audio stream is captured by at least one audio input module of the electronic device. Two or more of the audio streams are aggregated into a single audio stream. The single audio stream is outputted via at least one audio output module.

In yet another embodiment, a non-transitory computer program product for managing a distributed audio system is disclosed. The non-transitory computer program product comprises a computer readable storage medium having computer readable program code embodied therewith, the computer readable program code configured to perform a method. The method comprises receiving an audio stream from each electronic device in a plurality of electronic devices. The audio stream is captured by at least one audio input module of the electronic device. Two or more of the audio streams are aggregated into a single audio stream. The single audio stream is outputted via at least one audio output module.

In a further embodiment, a method for managing a distributed audio system is disclosed. The method comprises establishing a peer-to-peer connection with each electronic device in a plurality of electronic devices. At least one set of audio data is obtained. The at least one set of audio data is decoded into a plurality of audio sub-streams. Each audio sub-stream in the plurality of audio sub-streams comprises different audio data. Each audio sub-stream in the plurality of audio sub-streams is transmitted to a different electronic device in the plurality of electronic devices.

In one embodiment, a system and method enable a plurality of electronic devices to connect in a system via a computer network to enable a plurality of microphones to aggregate to one or more devices.

In another embodiment, a system and method enable a plurality of electronic devices to connect in a system via a computer network to enable a plurality of speakers which can playback audio in a synchronized manner, and said audio can be broken down into distinct channels. Each node in the plurality of speakers can playback one or more distinct streams.

In a further embodiment, a master device encodes and transmits an audio stream to connected client devices. The master device is able to transmit the same audio stream to each client device or selected audio sub-streams to each client device.

In yet another embodiment, a smart phone or mobile computing device is utilized as a synchronized speaker. Smart phones join a group via a data network and simultaneously broadcast the same audio stream, such as a distributed PA system, or another application is an on-demand or ad hoc stereo speakers, or home theater style 5.1 surround sound. In a similar mode, multiple devices can sync their microphone allowing for either 3-d sound analysis, or a single device broadcasts its audio stream from its microphone input to all of the other devices acting as speakers. Another use can be as a conference room speaker phone.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
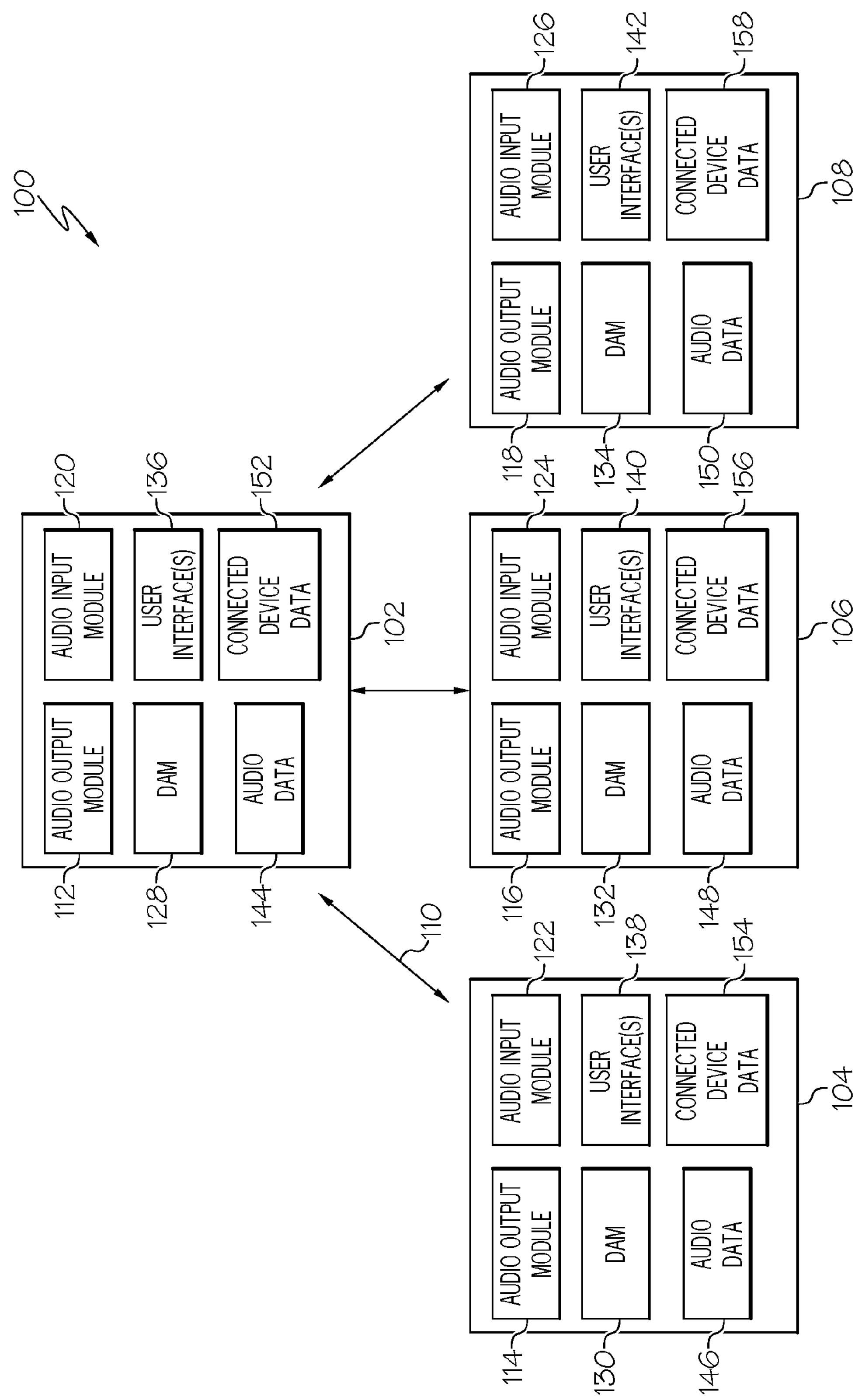
FIG. 1 shows a distributed audio system comprising a plurality of electronic devices having a peer-to-peer connection according to one embodiment of the present disclosure.

FIG. 1 shows an operating environment 100 according to one embodiment of the present disclosure. The operating environment 100 comprises one or more electronic (user) devices 102, 104, 106, 108 in fixed or dynamic positions. In one embodiment, an electronic device is an electronic device such as a wireless device capable of sending and receiving wireless signals. Examples of wireless devices include (but are not limited to) air-interface cards or chips, two-way radios, cellular telephones, mobile phones, smart phones, two-way pagers, wireless messaging devices, wearable computing devices, laptop computers, tablet computers, personal digital assistants, a combination of these devices, and/or other similar devices. It should be noted that, in some embodiments, one or more of the devices 102, 104, 106, 108 are not required to be portable and can be a desktop computing system, server system, and/or the like.

Two or more of the electronic devices 102, 104, 106, 108 are directly coupled to each other through wired (e.g., Ethernet or similar communication protocols) or wireless communication mechanisms 110, which includes short range communications. This eliminates the need for formal infrastructure, and allows the flexibility for users to create this network on-demand, without the need to pre-plan the network. Examples of short-range communication mechanisms include Bluetooth, ZigBee, Wireless Fidelity (Wi-Fi) such as 802.11 and its variations (e.g., 802.11b, 802.11g, 802.11ac, etc.), and/or the like.

Figure 2:
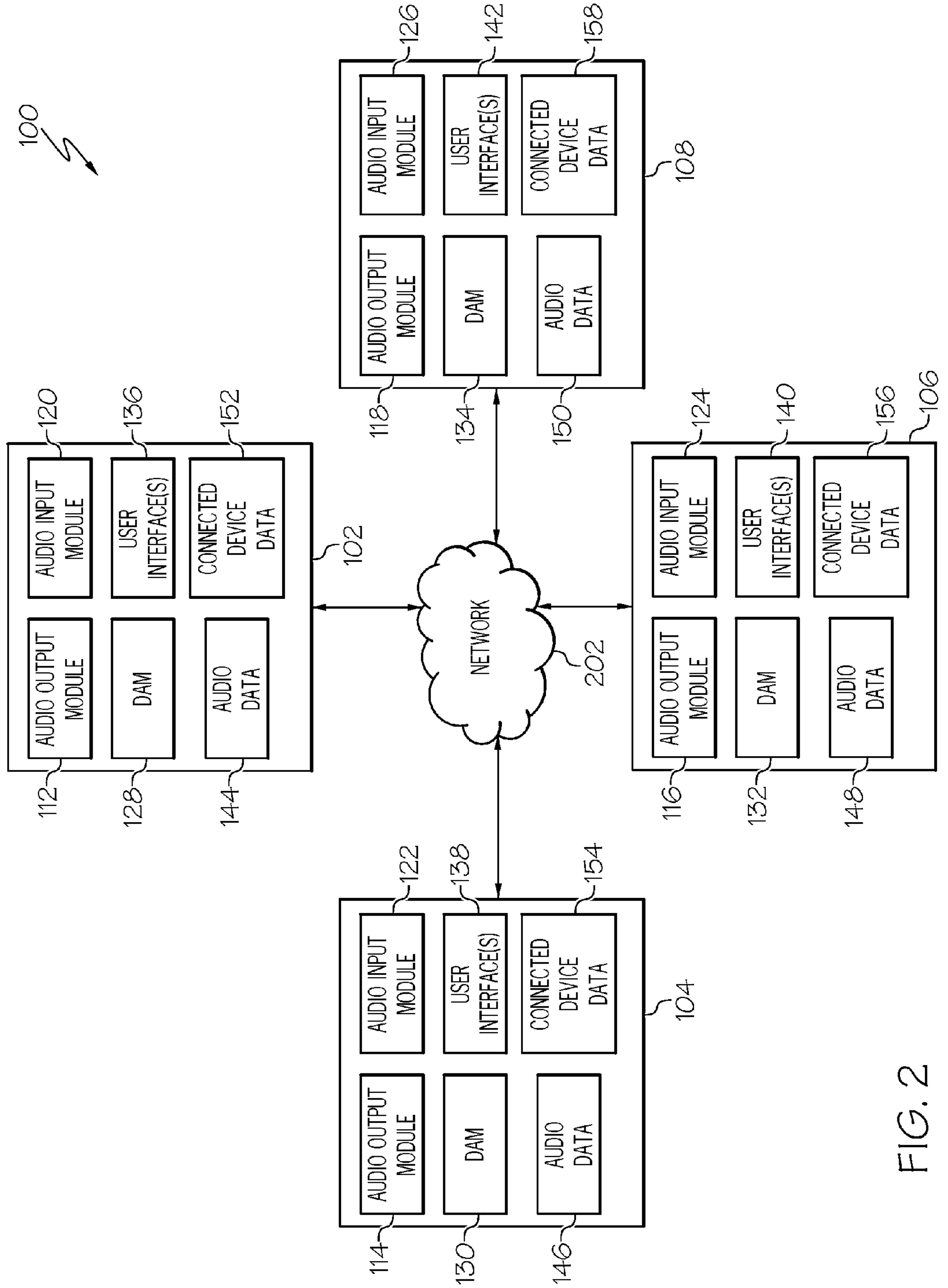
FIG. 2 shows a distributed audio system comprising a plurality of electronic devices having a connection via a non-peer-to-peer network or networks.

In another embodiment two or more of the electronic devices 102, 104, 106, 108 are communicatively coupled to each other via one or more wired and/or wireless networks 202, as shown in FIG. 2. The network 202 can comprise wireless communication networks, non-cellular networks such as Wireless Fidelity (Wi-Fi) networks, public networks such as the Internet, private networks, and/or the like. The wireless communication networks support any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication networks include one or more networks based on such standards. For example, in one embodiment, a wireless communication network comprises one or more of a Long Term Evolution (LTE) network, LTE Advanced (LTE-A) network, an Evolution Data Only (EV-DO) network, a General Packet Radio Service (GPRS) network, a Universal Mobile Telecommunications System (UMTS) network, and the like.

In one embodiment, each of the electronic devices 102, 104, 106, 108 comprises an audio output module(s) 112, 114, 116, 118 such as a speaker(s); an audio input module(s) 120, 122, 124, 126 such as a microphone(s); a distributed audio manager (DAM) 128, 130, 132, 134; a user interface(s) 136, 138, 140, 142; audio data 144, 146, 148, 150; and connected device data 152, 154, 156, 158. It should be noted that the electronic devices 102, 104, 106, 108 are required to include all of the above components. For example, one or more of the electronic devices 102, 104, 106, 108 may not include an audio input and/or output module. Each of these components is discussed in detail below.

The electronic devices 102, 104, 106, 108 utilize one or more of the above components to form a distributed audio system where audio captured by the audio input module of one or more devices is aggregated to one or more other devices. In other words, the captured audio can be streamed to and played by the audio output module of one or more other devices. In addition, the distributed audio system further allows for at least one of the devices to stream audio to a plurality of the other devices and have the audio played through their audio output module in a synchronized manner. Therefore, the plurality of other devices act as an aggregated speaker, where audio can be broken down into distinct channels. Each node of the aggregated speaker can playback one or more distinct audio streams.

In one embodiment, the DAM 128, 130, 32, 134 of each device 102, 104, 106, 108 detects potential candidates to be part of the distributed audio system. The user of a device 102 is able to select an option via the user interface 136 to initiate candidate detection. Alternatively, the DAM 128 can be configured to automatically and/or continuously search for candidate devices. In one embodiment, the DAM 128 searches for wireless signals being transmitted by other wireless devices. These signals, in one embodiment, are generated by the DAM 130, 132, 134 of the other devices and comprise data such as a unique identifier of the transmitting device; location of the transmitting device (optional); an indication as to whether the transmitting device desires to be part of a distributed audio group; and/or the like. In another embodiment, the DAM 128 also searches for remote devices that communicate with the device 102 through one or more networks such as cellular network, the Internet, and/or the like. In this embodiment, the DAM 128 is able to send a query to a server (not shown) for devices registered with the server to be part of a distributed audio system. The device 102 can also be sent a list of registered devices from the server as well.

When the DAM 128 detects one or more candidate devices, the DAM 128 notifies the user of the device 102 via the user interface 136. The user is then able to select an option via the interface 136 that instructs the DAM 128 to establish a connection/session with the detected device(s). In another embodiment, the DAM 128 automatically establishes a connection/session with one or more of the detected devices. It should be noted that, in some embodiments, the user is presented with device characteristic information for each detected device to help the user decide which devices to select as part of the distributed audio system. The device characteristic information can include data such as device location, device hardware resources, device network performance, and/or the like. This device characteristic information can be provided by the devices within the wireless signals detected by the DAM 128. The DAM 128 can also utilize the device characteristic information to automatically select candidate devices to be part of the distributed audio system as well.

When one or more devices 104, 106, 108 are selected to be part of the distributed audio system with the first device 102, the DAM 128 of the first device 102 sends a connection request to each of the devices 104, 106, 108. The connection request comprises information such as a unique identifier of the first device 102, optional location information for the first device, and/or the like. The connection request can be transmitted from the first device 102 directly to (peer-to-peer) each of the one or more devices 104, 106, 108. If a device 104, 106 108 is a remote device, the connection request (and any other transmission) can sent to the device 104, 106, 108 via one or more networks through one or more intermediate nodes.

When the devices 104, 106, 108 receive the connection request their DAMs 130, 132, 134 prompt their users via the user interfaces 138, 140, 142 that a distributed audio connection request has been received. The user is then able to accept or deny the connection request. In another embodiment, the DAM 130, 132, 134 of a device can be configured to automatically accept or deny the connection request. The DAM 130, 132, 134 of the devices 104, 106, 108 transmits a connection reply to the requesting device 102. The DAM 128 of the requesting device 102 receives the connection reply accepting or denying the connection request. The DAM 128 notifies the user, via the user interface 130, whether the devices 104, 106, 108 accepted or rejected the connection request. If a device 104, 106, 108 accepts the connection request, a connection/session is established between the requesting device 102 and the accepting device 104, 106, 108. In one embodiment, the connection between the devices 102, 104, 106, 108 creates a peer-to-peer network (such as an ad hoc network) or on demand network. However, it should be noted that at least two of these devices may be connected/coupled to each other via a network(s) comprising one or more intermediate nodes.

In another embodiment, device 102 listens/monitors for connection requests from the other devices 104, 106, 108. In this embodiment, the DAM 130, 132, 134 of devices 104, 106, 108 detects device 102 similar to that discussed above and sends a connection request to device 102. The DAM 128 of device 102 can prompt its user to accept/deny the request(s) or automatically accept/deny the request(s). If accepted, the DAM 128 of device 102 establishes a connection with devices 104, 106, 108 as discussed above.

Each device updates its connected device data 152, 154, 156, 158 to include one or more entries identifying its connected devices. For example, if devices 104, 106, 108 have been connected to device 102 then device 102 updates its connected device data 152 to include the unique identifiers of devices 104, 106, 108; data identifying the connection/session between each device; optionally device characteristic information discussed above; and/or the like. Devices 104, 106, 108 similarly update their connected device data 154, 156, 158 for device 102. If a device disconnects from another device, the entry for the disconnected device can be removed from the connected device data 152, 154, 156, 158.

In one embodiment, at least one of the devices 102, 104, 106, 108 acts as a master/server device to which the other devices connect with. For example, device 102 acts as the master device and devices 104, 106, 108 act as client devices. In this embodiment, once devices 104, 106, 108 connect to device 102, the DAM 130, 132, 134 of these devices begins recording audio signals utilizing the audio input module(s) 122, 124, 126. The DAM 130, 132, 134 encodes the recorded audio using a configurable encoding algorithm implemented in either software or hardware. The encoding algorithm can be user selected or automatically selected by the DAM 130, 132, 134 of the client devices 104, 106, 108 or by the DAM 128 of the master device 102 based on hardware and network conditions for best performance or best quality. For example, the DAM 128 of the master device 102 (and/or the DAMs 130, 132, 134 of the client devices) monitors configuration changes (such as the number of client devices, audio quality parameters set by the user, etc.) or environment changes such as network latencies. Based on this data, the DAM 128 of the master device 102 and/or the DAMs 130, 132, 134 of the client devices can select or adjust the encoding algorithm for the recorded audio.

In some embodiments, the DAM 128 of the master device 102 presents a list of connected devices 104, 106, 108 to the user via the user interface 130. The list can display attributes of the connected devices such as location, device type/model, etc. The user is then able to select one or more of the listed devices that the user would like to receive audio from. The DAM 128 of the master device 102 then communicates with the DAM 130, 132, 134 of the selected client devices to instruct the selected devices to transmit their recorded audio (and/or start capturing audio). In another embodiment, all of the client devices transmit their audio to the master device 102 and the DAM 128 only presents the audio from the selected devices to the user.

The client devices 104, 106, 108 transmit their encoded audio to the master device 102 in real-time or near real-time, or store the audio for transmission to the master 102 at a later point in time. In one embodiment, the audio is transmitted along with at least the unique identifier of the transmitting device. A time stamp can also be generated by the DAM 130, 132, 134 of the client device identifying the transmission time. The audio can also be transmitted with a unique session identifier uniquely identifying the communication session between the specific client device and the master device 102.

In some embodiments, a distributed audio system identifier is utilized that uniquely identifies a specific distributed audio system. For example, devices 102, 104, 106, 108 may form a first distributed audio system while devices 104, 106, 108 may form a second distributed audio system. In other words, a single device can be part of multiple distributed audio systems either as a client device and/or a master device. Each of these audio systems can be assigned a unique identifier by the master device of the system. Therefore, transmissions from members of a specific distributed audio system can also include the identifier of the system as well. This allows devices who are members of multiple distributed audio systems to track which transmissions are being sent to specific distributed audio systems. In one embodiment, the client devices 104, 106, 108 create an entry within the audio data 146, 148, 150 for each transmission comprising, for example, the time stamp, a transmission identifier uniquely identifying a given transmission, session identifier, distributed audio system identifier, identifier of the recipient device, and/or the like. This allows a client device to identifying various attributes of a specific transmission.

Upon reception of a transmission from a client device 104, 106, 108, the DAM 128 of the master device 102 decodes the audio with an appropriate decoder, implemented either in software or hardware. The DAM 128 extracts metadata from the transmission and creates an entry within the audio data 144 for the given transmission. This entry comprises data such as the time stamp, transmission identifier, session identifier, distributed audio system identifier, etc. and stores this data as part of its audio data 144 where each. The DAM 128 can also store the actual audio data form a transmission as well. In some embodiment, the DAM 128 generates a reception time stamp identifying the time at which a transmission was received from a client device. The reception time stamp is stored within the entry created for the transmission in the audio data 144.

The DAM 128 of the master device 128 aggregates the audio transmissions/streams received from the client devices 104, 106, 108. The DAM 128 then outputs the aggregated audio via the audio output 112 module and/or redirects the aggregated audio to any software audio input stream such as an ongoing voice call, or to another connected audio output device, such as an external speaker. In other embodiments, the user of the master device 102 is able to select, via the user interface 130, one or more specific audio streams received from a client device(s) for output or redirection. For example, the DAM 128 can present a list of connected clients and their streams to the user via the user interface 130. The user is able to select one or more particular client/stream to listen to or have the selected stream redirected to an external device. Alternatively, the user is able to select multiple streams from the list and have these streams aggregated into a single stream for output or redirection. It should be noted that in addition to outputting audio received from client devices, the master device 102 can relay/transmit the individual and/or aggregated audio to other electronic devices including the client devices 104, 106, 108.

In at least some embodiments, time synchronization is utilized by the DAM 128 of the master device 128 and the DAMs 130, 132, 134 of the client devices 104, 106, 108 to facilitate audio aggregation by the master device 102. For example, as part of the client connection with the master device, the clients 104, 106, 108 and the master device 102 perform a time synchronization routine such as synchronizing their clocks to a common clock. Therefore, the time stamps generated by the client devices 104, 106, 108 and transmitted along with their encoded audio are synchronized with the clock of the master device 102. This allows the DAM 128 of the master device 102 to discard audio streams, which arrive late, and considered errant data. A threshold time value such as 20 ms (or another other time value) may be configured at the master device 102 to create the filter for discarding late-arriving audio. In another embodiment, the devices 102, 104, 106, 108 can also calculate a timing offset relative to each other's clocks and transmit this offset to the master device 102. The DAM 128 of the master device 102 can utilize these offsets or the time stamps to calculate transmission latencies for each of the client devices.

In addition to receiving audio from client devices 104, 106, 108, the master device 102 can also encode and transmit an audio stream to the client devices 104, 106, 108. This, in effect, reverses the flow of audio stream data as compared to the embodiments discussed above. The master device 102 is able to connect with N number of client devices 104, 106, 108 and distribute audio to each client's respective audio output module 114, 116, 118. In one embodiment, the DAM 128 of the master device 102 obtains audio data and encodes the audio similar to the embodiments discussed above. The audio can be obtained from the audio input module 120 of the master device 102, stored locally on the device 102, received as a stream, etc.

The DAM 128 of the master device 102 then transmits the same audio stream to each client device 104, 106, 108, or transmits selected audio sub-streams to each client device 104, 106, 108. For example, consider one example where the DAM 128 of the master device 102 decodes 4-channel audio into four separate channels. In this example, the DAM 128 distributes a first audio stream to the first client 104, a second audio stream to second client 106, and so on until each client device has an audio stream. If there are more audio streams than clients, the audio streams are repeated to the remaining clients. In addition, audio streams can be combined in part or whole, for example, channel 1 and 2 of the audio stream can be sent to a single client. In another example, the master device 102 decodes 5.1-surround sound audio stream into its distinct channels for distribution in the same manner as the previously discussed embodiment. When a client device 104, 106, 108 receive the audio stream from the master device 102, the DAM 130, 132, 134 of the client device outputs the audio stream via the audio output module. In one embodiment, the client device 104, 106, 108 is configured to automatically output any audio received via a communication session with the master device 102. Stated differently, the master device 102 is granted access to the audio output modules 114, 116, 118 of the client devices as if they were the master device's own audio output module.

The master device 102 updates its audio data 144 an entry for each transmission similar to the embodiments discussed above. For example, the master device 102 adds an entry comprising, for example, a time stamp indicating transmission time, a transmission identifier uniquely identifying a given transmission, session identifier, distributed audio system identifier, identifier of the recipient device, and/or the like. The client devices 104, 106, 108 also update their audio data 146, 148, 150 similar to the embodiments discussed above as well.

In one embodiment, the master device 102 additionally transmits time synchronization data much in the same manner as an earlier embodiment such that the client devices 104, 106, 108 can filter and discard late arriving audio stream data. Additional playback data can be transmitted from clients 104, 106, 108 to the master device 102 to indicate the state of playback for each client. The master device 102 uses this data to determine network conditions and adjust encoding parameters, transmission speed, or other performance affecting parameters such that a configuration can be met. Such configuration can be setup so that a percentage of clients must be reporting timely playback of audio streams, within the configured threshold.

Figure 3:
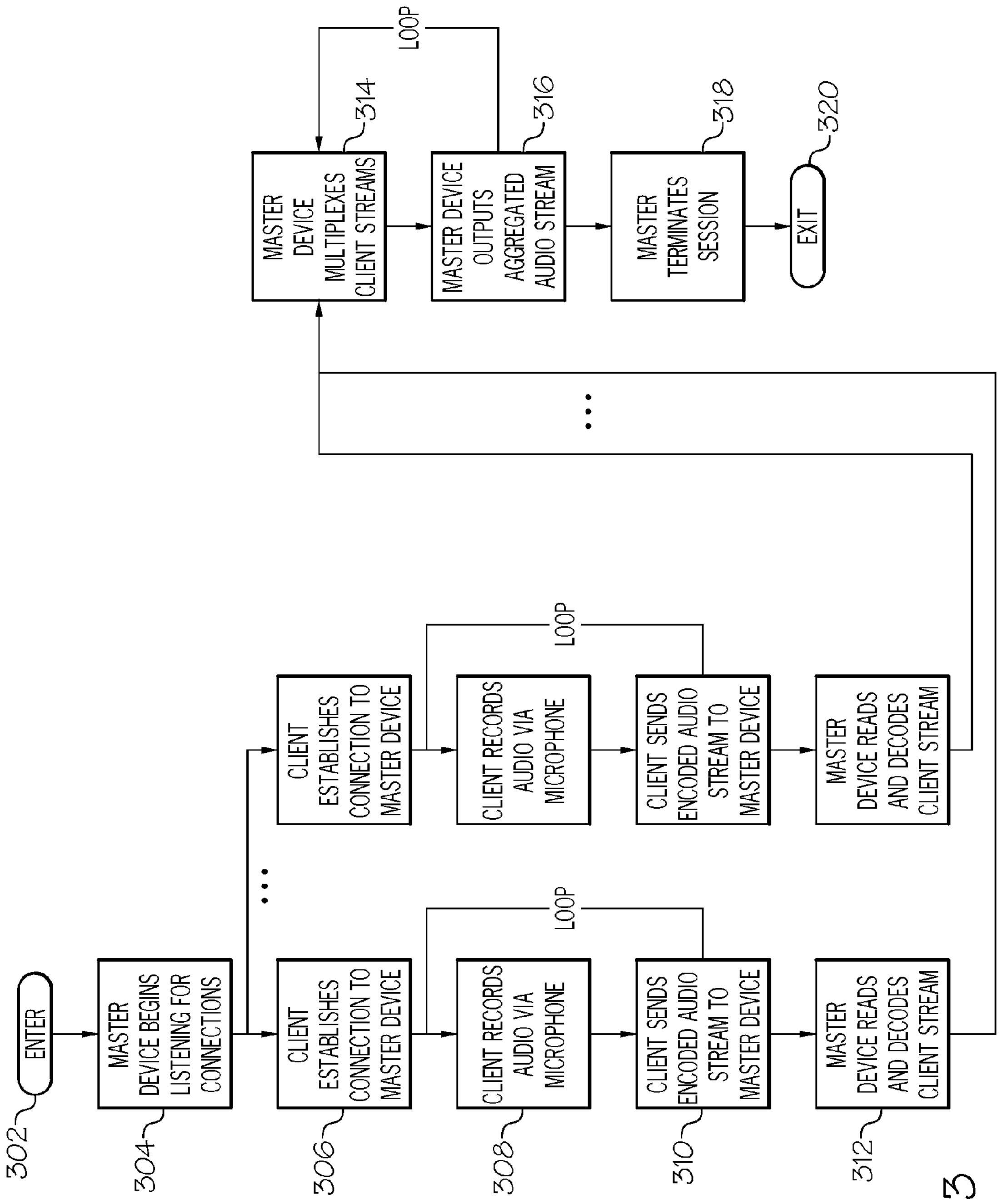
FIG. 3 is an operational flow diagram illustrating one example of configuring a plurality of wireless electronic devices for an ad hoc distributed audio system according to one embodiment of the present disclosure.

FIG. 3 is an operational flow diagram illustrating one example of the setup process for creating an ad hoc or on demand network for audio aggregation and playback. The operational flow begins at 302 and flows directly to 304. The master device 102, at step 304, is enabled and opens a network socket capable of accepting new connections. 1 to N client devices 104, 106, 108 clients, at step 306, can connect to the master device 102 at any time during this process by creating a socket connection to the master device 102. However, connection of clients may be limited due to configuration at the master device 102.

Client devices 104, 106, 108 that have connected successfully, at step 308, begin recording audio via their audio input module 120, 122, 124, 126. The client devices 104, 106, 108, at step 310, encode the recorded audio stream and transmit the encoded stream to the master device 102. This process continues by looping on step 308 and 310, thus each client device 104, 106, 108 transmits a continuous audio stream to the master device 102. The master device 102, at step 312, reads each connected client's incoming audio stream and decodes it using the appropriate hardware or software decoder at step 312. If there are multiple connected clients that have transmitted an audio stream, the master device 102 multiplexes the audio into a single stream at step 314. In other embodiments, the operational flow includes steps to perform time synchronization, or in some cases calculate the time offset of each device in the system. In additional embodiments, the operational flow includes steps to detect and filter late-arriving data streams.

Figure 4:
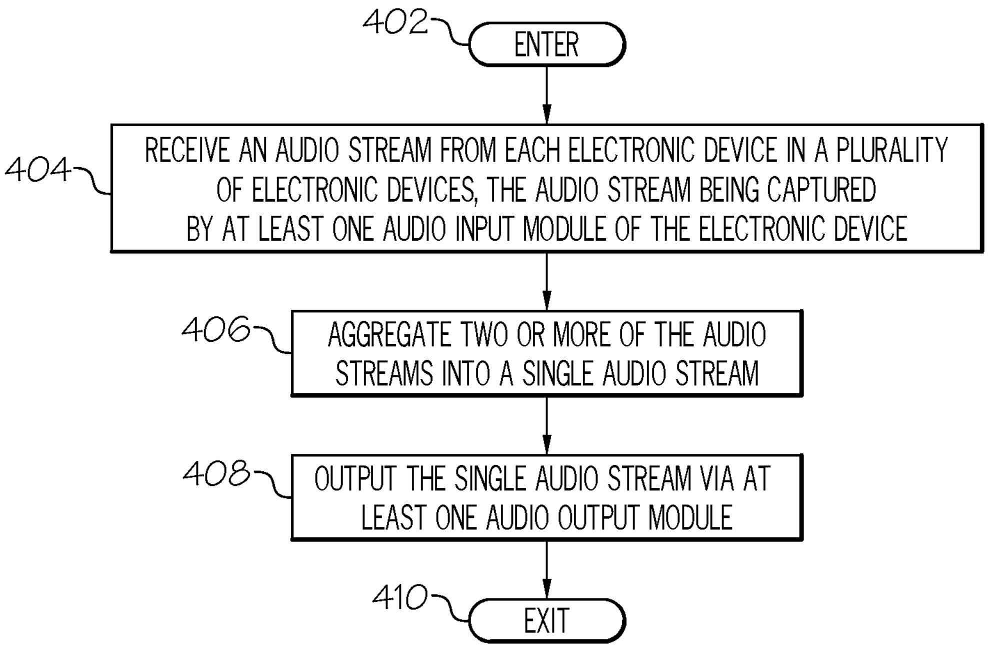
FIG. 4 is an operational flow diagram illustrating one example managing a distributed audio system according to one embodiment of the present disclosure.

FIG. 4 is an operational flow diagram illustrating one example of managing a distributed audio system. The operational flow begins at 402 and flows directly to 404. A user device 102, at step 404, receives an audio stream from each electronic device 104, 106, 108 in a plurality of electronic devices. The user device 102, at step 406, aggregates two or more of the audio streams into a single audio stream. The user device 102, at step 408, outputs the single audio stream via at least one audio output module 112. The control flow exits at step 410.

Figure 5:
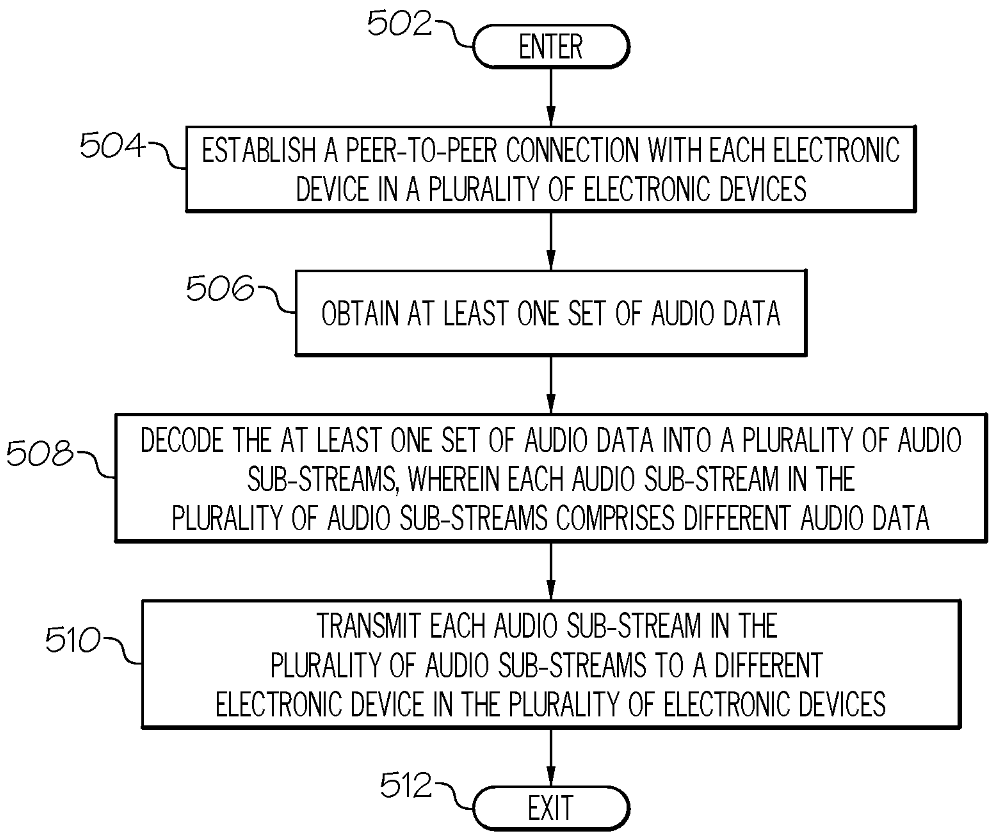
FIG. 5 is an operational flow diagram illustrating another example managing a distributed audio system according to one embodiment of the present disclosure.

FIG. 5 is an operational flow diagram illustrating another example of managing a distributed audio system. The operational flow begins at 502 and flows directly to 504. A user device 102, at step 504, establishes a peer-to-peer connection with each electronic device 104, 106, 108 in a plurality of electronic devices. The user device 102, at step 506, obtains at least one set of audio data. The user device 102, at step 508, decodes the at least one set of audio data into a plurality of audio sub-streams. Each audio sub-stream in the plurality of audio sub-streams comprises different audio data. The user device 102, at step 510, transmits each audio sub-stream in the plurality of audio sub-streams to a different electronic device in the plurality of electronic devices. In some embodiments, the audio sub-streams are transmitted simultaneously to the different electronic devices. The control flow exits at step 512.

Figure 6:
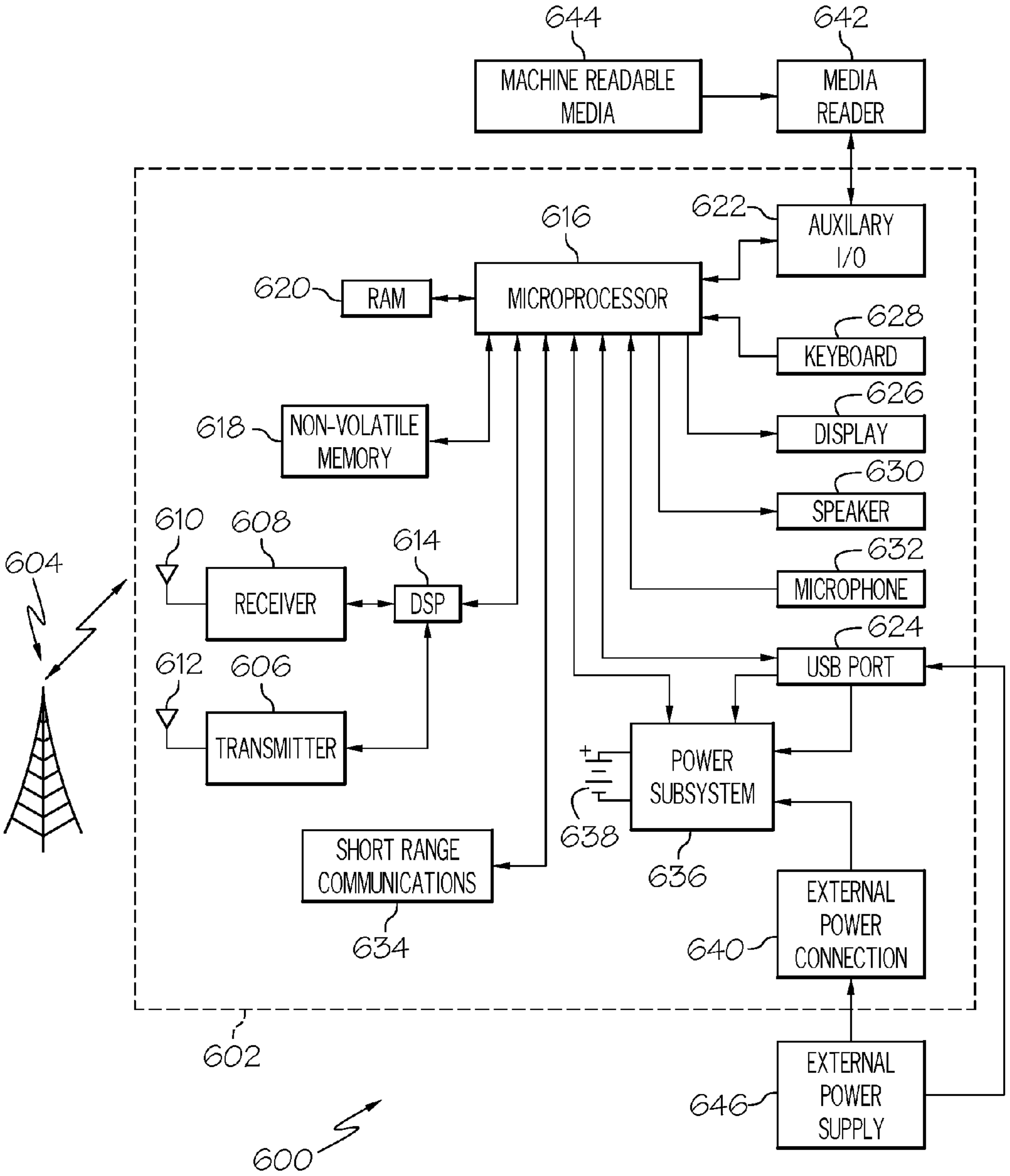
FIG. 6 is a block diagram illustrating one example of a wireless communication device according to one embodiment of the present disclosure.

FIG. 6 is a block diagram of an electronic device and associated components 600 in which the systems and methods disclosed herein may be implemented. In this example, an electronic device 602 is the user device 102 of FIG. 1 and is a wireless two-way communication device with voice and data communication capabilities. Such electronic devices communicate with a wireless voice or data network 604 using a suitable wireless communications protocol. Wireless voice communications are performed using either an analog or digital wireless communication channel. Data communications allow the portable electronic device 602 to communicate with other computer systems via the Internet. Examples of electronic devices that are able to incorporate the above described systems and methods include, for example, a data messaging device, a two-way pager, a cellular telephone with data messaging capabilities, a wireless Internet appliance, a tablet computing device or a data communication device that may or may not include telephony capabilities.

The illustrated portable electronic device 602 is an example electronic device that includes two-way wireless communications functions. Such electronic devices incorporate communication subsystem elements such as a wireless transmitter 606, a wireless receiver 608, and associated components such as one or more antenna elements 610 and 612. A digital signal processor (DSP) 614 performs processing to extract data from received wireless signals and to generate signals to be transmitted. The particular design of the communication subsystem is dependent upon the communication network and associated wireless communications protocols with which the device is intended to operate.

The portable electronic device 602 includes a microprocessor 616 that controls the overall operation of the portable electronic device 602. The microprocessor 616 interacts with the above described communications subsystem elements and also interacts with other device subsystems such as non-volatile memory 618 and random access memory (RAM) 620. The non-volatile memory 618 and RAM 620 in one example contain program memory and data memory, respectively. The microprocessor 616 also interacts with an auxiliary input/output (I/O) device 622, a Universal Serial Bus (USB) and/or other data port(s) 624, a display 626, a keyboard 628, a speaker 630, a microphone 632, a short-range communications subsystem 634, a power subsystem 636 and any other device subsystems.

A power supply 638, such as a battery, is connected to a power subsystem 636 to provide power to the circuits of the portable electronic device 602. The power subsystem 636 includes power distribution circuitry for providing power to the portable electronic device 602 and also contains battery charging circuitry to manage recharging the battery power supply 638. The power subsystem 636 includes a battery monitoring circuit that is operable to provide a status of one or more battery status indicators, such as remaining capacity, temperature, voltage, electrical current consumption, and the like, to various components of the portable electronic device 602. An external power supply 646 is able to be connected to an external power connection 640.

The data port 624 further provides data communication between the portable electronic device 602 and one or more external devices. Data communication through data port 624 enables a user to set preferences through the external device or through a software application and extends the capabilities of the device by enabling information or software exchange through direct connections between the portable electronic device 602 and external data source rather than via a wireless data communication network.

Operating system software used by the microprocessor 616 is stored in non-volatile memory 618. Further examples are able to use a battery backed-up RAM or other non-volatile storage data elements to store operating systems, other executable programs, or both. The operating system software, device application software, or parts thereof, are able to be temporarily loaded into volatile data storage such as RAM 620. Data received via wireless communication signals or through wired communications are also able to be stored to RAM 620. As an example, a computer executable program configured to perform the capture management process 600, described above, is included in a software module stored in non-volatile memory 618.

The microprocessor 616, in addition to its operating system functions, is able to execute software applications on the portable electronic device 602. A predetermined set of applications that control basic device operations, including at least data and voice communication applications, can be installed on the portable electronic device 602 during manufacture. Examples of applications that are able to be loaded onto the device may be a personal information manager (PIM) application having the ability to organize and manage data items relating to the device user, such as, but not limited to, e-mail, calendar events, voice mails, appointments, and task items. Further applications include applications that have input cells that receive data from a user.

Further applications may also be loaded onto the portable electronic device 602 through, for example, the wireless network 604, an auxiliary I/O device 622, USB port 624, short-range communications subsystem 636, or any combination of these interfaces. Such applications are then able to be installed by a user in the RAM 620 or a non-volatile store for execution by the microprocessor 616.

In a data communication mode, a received signal such as a text message or a web page download is processed by the communication subsystem, including wireless receiver 608 and wireless transmitter 606, and communicated data is provided the microprocessor 616, which is able to further process the received data for output to the display 626, or alternatively, to an auxiliary I/O device 622 or the data port 624. A user of the portable electronic device 602 may also compose data items, such as e-mail messages, using the keyboard 628, which is able to include a complete alphanumeric keyboard or a telephone-type keypad, in conjunction with the display 628 and possibly an auxiliary I/O device 622. Such composed items are then able to be transmitted over a communication network through the communication subsystem.

For voice communications, overall operation of the portable electronic device 602 is substantially similar, except that received signals are generally provided to a speaker 630 and signals for transmission are generally produced by a microphone 634. Alternative voice or audio I/O subsystems, such as a voice message recording subsystem, may also be implemented on the portable electronic device 602. Although voice or audio signal output is generally accomplished primarily through the speaker 630, the display 626 may also be used to provide an indication of the identity of a calling party, the duration of a voice call, or other voice call related information, for example.

A short-range communications subsystem 636 provides for communication between the portable electronic device 602 and different systems or devices, which need not necessarily be similar devices. For example, the short-range communications subsystem 636 may include an infrared device and associated circuits and components or a Radio Frequency based communication module such as one supporting Bluetooth® communications, to provide for communication with similarly-enabled systems and devices.

A media reader 642 is able to be connected to an auxiliary I/O device 622 to allow, for example, loading computer readable program code of a computer program product into the portable electronic device 602 for storage into non-volatile memory 618. In one example, computer readable program code includes instructions for performing the capture management process 600, described above. One example of a media reader 642 is an optical drive such as a CD/DVD drive, which may be used to store data to and read data from a computer readable medium or storage product such as computer readable storage media 644. Examples of suitable computer readable storage media include optical storage media such as a CD or DVD, magnetic media, or any other suitable data storage device. Media reader 642 is alternatively able to be connected to the electronic device through the data port 624 or computer readable program code is alternatively able to be provided to the portable electronic device 602 through the wireless network 604.

Figure 7:
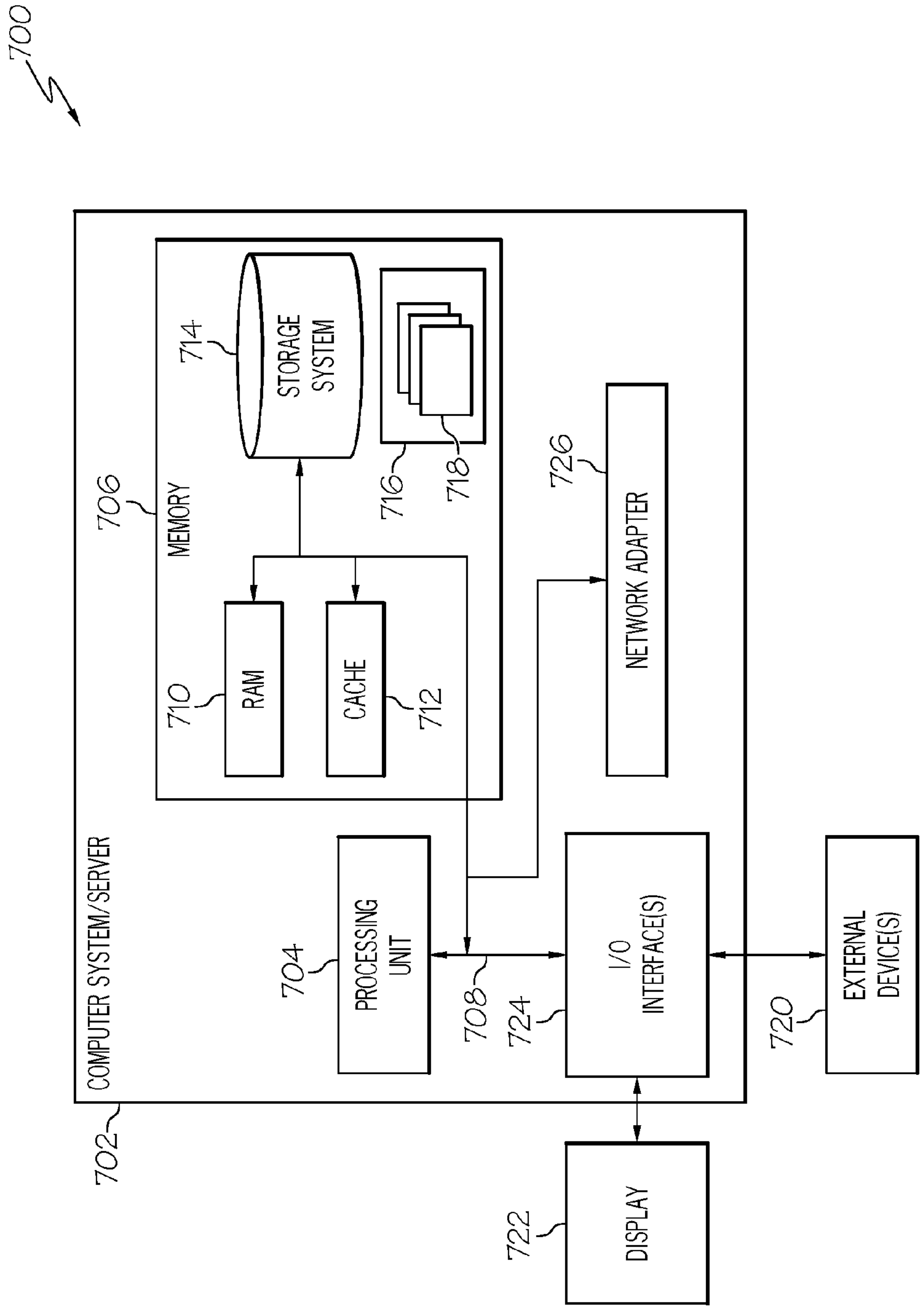
FIG. 7 is a block diagram illustrating one example of an information processing system according to one embodiment of the present disclosure.

Referring now to FIG. 7, this figure is a block diagram illustrating an information processing system that can be utilized in embodiments of the present disclosure. The information processing system 702 is based upon a suitably configured processing system configured to implement one or more embodiments of the present disclosure.

Any suitably configured processing system can be used as the information processing system 702 in embodiments of the present disclosure. The components of the information processing system 702 can include, but are not limited to, one or more processors or processing units 704, a system memory 706, and a bus 708 that couples various system components including the system memory 706 to the processor 704. The bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 706 includes computer system readable media in the form of volatile memory, such as random access memory (RAM) 710 and/or cache memory 712. The information processing system 702 can further include other removable/non-removable, volatile/non-volatile computer system storage media. By way of example only, a storage system 714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 708 by one or more data media interfaces. The memory 706 can include at least one program product having a set of program modules that are configured to carry out the functions of an embodiment of the present disclosure.

Program/utility 716, having a set of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of embodiments of the present disclosure.

The information processing system 702 can also communicate with one or more external devices 720 such as a keyboard, a pointing device, a display 722, etc.; one or more devices that enable a user to interact with the information processing system 702; and/or any devices (e.g., network card, modem, etc.) that enable computer system/server 702 to communicate with one or more other computing devices. Such communication can occur via I/O interfaces 724. Still yet, the information processing system 702 can communicate with one or more networks such as a local area network (LAN), a general wide area network (WAN), and/or a public network (e.g., the Internet) via network adapter 726. As depicted, the network adapter 726 communicates with the other components of information processing system 702 via the bus 708. Other hardware and/or software components can also be used in conjunction with the information processing system 702. Examples include, but are not limited to: microcode, device drivers, redundant processing units, external disk drive arrays, RAID systems, tape drives, and data archival storage systems.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been discussed above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, with a user device, for managing a distributed audio system, the method comprising:

receiving an audio stream from each electronic device in a plurality of electronic devices, the audio stream being captured by at least one audio input module of the electronic device, wherein the user device is separate and distinct from the plurality of electronic devices;

in response to receiving the audio stream from each electronic device, identifying at least one timestamp within at least one of the audio streams, wherein the at least one time stamp was generated by the electronic device of the plurality of electronic devices that captured the at least one of the audio streams, and wherein the at least one timestamp indicates a time when the electronic device transmitted the at least one of the audio streams;

comparing the timestamp to time threshold;

discarding the at least one of the audio streams in response to the timestamp failing to satisfy the time threshold;

after discarding the at least one of the audio streams, aggregating two or more of the remaining audio streams received from the plurality of electronic devices into a single audio stream; and audibly outputting the single audio stream via at least one audio output module of the user device.

2. The method of claim 1, wherein at least one of the audio streams is received over a peer-to-peer connection with at least one electronic device in the plurality of electronic devices.

3. The method of claim 1, further comprising:

monitoring one or more network characteristics associated with a network through which the audio stream from each electronic device in the plurality of electronic devices is received; and instructing at least one electronic device in the plurality of electronic devices to adjust an encoding of a subsequent audio stream based on the one or more network characteristics that have been monitored.

4. The method of claim 1, further comprising:

detecting at least one electronic device in the plurality of electronic devices; and automatically establishing a communication session with at least one electronic device.

5. The method of claim 1, wherein aggregating two or more of the audio streams into a single audio stream comprises:

presenting a list identifying each electronic device in the plurality of electronic devices;

receiving, from a user of the user device, a selection of two or more electronic devices identified in the list; and aggregating the audio streams from the two or more electronic devices into the single audio stream.

6. The method of claim 1, further comprising:

presenting a list identifying each electronic device in the plurality of electronic devices;

receiving, from a user of the user device, a selection of at least one electronic device in the plurality of electronic devices; and instructing the at least one electronic device to being capturing audio with at least one audio input module of the at least one electronic device.

7. A computer program product for managing a distributed audio system, the computer program product comprising a non-transitory computer readable storage medium encoded with instructions that when executed by a processor cause the processor to perform:

receiving a first audio stream from each electronic device in a first plurality of electronic devices, the first audio stream being captured by at least one audio input module of the electronic device in the first plurality of electronic devices, wherein each first audio stream received from the first plurality of electronic devices comprises a first identifier uniquely identifying the first plurality of electronic devices;

receiving a second audio stream from each electronic device in a second plurality of electronic devices, the second audio stream being captured by at least one audio input module of the electronic device in the first plurality of electronic devices, wherein each second audio stream received from the second plurality of electronic devices comprises a second identifier uniquely identifying the second plurality of electronic devices, and wherein at least one electronic device is common between first plurality of electronic devices and the second plurality of electronic devices;

identifying two or more of the first audio streams based on the first identifier;

aggregating the two or more of the first audio streams into a first single audio stream;

associating the first single audio stream with the first identifier;

identifying two or more of the second audio streams based on the second identifier;

aggregating the two or more of the second audio streams into a second single audio stream;

associating the second single audio stream with the second identifier;

identifying at least one electronic device of the first plurality of electronic devices based on the first identifier;

in response to identifying the at least one electronic device of the first plurality of electronic devices, transmitting the first single audio stream to the at least one electronic device;

identifying at least one electronic device of the second plurality of electronic devices based on the second identifier;

in response to identifying the at least one electronic device of the second plurality of electronic devices, transmitting the second single audio stream to the at least one electronic device.

8. The computer program product of claim 7, wherein the wherein the instructions further cause the processor to perform:

identifying at least one timestamp within at least one of the audio streams;

comparing the timestamp to time threshold; and discarding the at least one of the audio streams in response to the timestamp failing to satisfy the time threshold.

9. The computer program product of claim 7, wherein at least one of the audio streams is received over a peer-to-peer connection with at least one electronic device in the plurality of electronic devices.

10. The computer program product of claim 7, wherein the instructions further cause the processor to perform:

monitoring one or more network characteristics associated with a network through which the audio stream from each electronic device in the plurality of electronic devices is received; and instructing at least one electronic device in the plurality of electronic devices to adjust an encoding of a subsequent audio stream based on the one or more network characteristics that have been monitored.

11. The computer program product of claim 7, wherein the instructions further cause the processor to perform:

detecting at least one electronic device in the plurality of electronic devices; and automatically establishing a communication session with at least one electronic device.

12. The computer program product of claim 7, wherein aggregating two or more of the audio streams into a single audio stream comprises:

presenting a list identifying each electronic device in the plurality of electronic devices;

receiving, from a user of the user device, a selection of two or more electronic devices identified in the list; and aggregating the audio streams from the two or more electronic devices into the single audio stream.

13. The computer program product of claim 7, wherein the instructions further cause the processor to perform:

presenting a list identifying each electronic device in the plurality of electronic devices;

receiving, from a user of the user device, a selection of at least one electronic device in the plurality of electronic devices; and instructing the at least one electronic device to being capturing audio with at least one audio input module of the at least one electronic device.

14. A method, with a user device, for managing a distributed audio system, the method comprising:

establishing a peer-to-peer connection with each electronic device in a plurality of electronic devices, wherein the user device is separate and distinct from the plurality of electronic devices, and wherein the user device and each electronic device in the plurality of electronic devices are portable wireless communication devices;

downloading at least one set of surround sound audio data;

decoding the at least one set of surround sound audio data into a plurality of audio sub-streams, wherein each audio sub-stream in the plurality of audio sub-streams comprises audio data for a different channel of the surround sound audio data than each remaining audio sub-stream in the plurality of audio sub-streams; and wirelessly transmitting each audio sub-stream in the plurality of audio sub-streams to a different electronic device in the plurality of electronic devices.

15. The method of claim 14, further comprising:

synchronizing a clock of the user device with a clock of each electronic device in the plurality of electronic devices; and generating a time stamp utilizing the synchronized clock.

16. The method of claim 15, further comprising:
transmitting the time stamp with each audio sub-stream.

17. The method of claim 14, further comprising:
monitoring one or more network characteristics associated with the peer-to-peer network; and
adjusting an encoding of at least one of the audio sub-streams based on the one or more network characteristics that have been monitored.

18. The method of claim 14, wherein each audio sub-stream in the plurality of audio sub-streams is simultaneously transmitted to a different electronic device in the plurality of electronic devices.

19. The method of claim 14, further comprising:
determining that the plurality of audio sub-streams comprises more audio sub-streams than a number of electronic devices in the plurality of electronic devices; and
in response to determining that the plurality of audio sub-streams comprises more audio sub-streams than a number of electronic devices in the plurality of electronic devices, combining at least two of the plurality of sub-streams into a single sub-stream.

* * * * *